United States Patent
Bergweiler et al.

(10) Patent No.: US 9,758,175 B2
(45) Date of Patent: Sep. 12, 2017

(54) METHOD AND DEVICE FOR IMPROVED SWITCHING OVER BETWEEN ACCELERATOR PEDAL CHARACTERISTIC CURVES

(71) Applicant: Bayerische Motoren Werke Aktiengesellschaft, Munich (DE)

(72) Inventors: Tobias Bergweiler, Munich (DE); Gerd Kraemer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/732,177

(22) Filed: Jun. 5, 2015

(65) Prior Publication Data

US 2015/0266491 A1    Sep. 24, 2015

Related U.S. Application Data

(63) Continuation of application No. PCT/EP2013/075044, filed on Nov. 29, 2013.

(30) Foreign Application Priority Data

Dec. 6, 2012  (DE) ........................ 10 2012 222 482

(51) Int. Cl.
*B60W 50/00*     (2006.01)
*B60W 50/08*     (2012.01)
(Continued)

(52) U.S. Cl.
CPC ......... *B60W 50/082* (2013.01); *F02D 11/105* (2013.01); *F02D 41/2422* (2013.01);
(Continued)

(58) Field of Classification Search
USPC .......................................... 701/99
See application file for complete search history.

(56) References Cited

U.S. PATENT DOCUMENTS

| | | | |
|---|---|---|---|
| 8,538,651 B2 * | 9/2013 | Asahara | B60W 30/188 180/178 |
| 8,954,232 B2 * | 2/2015 | Takeuchi | B60W 10/06 701/37 |

(Continued)

FOREIGN PATENT DOCUMENTS

| | | |
|---|---|---|
| CN | 102416957 A | 4/2012 |
| CN | 102741081 A | 10/2012 |

(Continued)

OTHER PUBLICATIONS

International Search Report dated Mar. 4, 2014 (Two (2) pages).

(Continued)

*Primary Examiner* — John R Olszewski
*Assistant Examiner* — James M McPherson
(74) *Attorney, Agent, or Firm* — Crowell & Moring LLP

(57) ABSTRACT

A method and a device for predefining a torque output of a motor vehicle drive engine when switching over accelerator pedal characteristic curves. The method and the device determine a setpoint change in the acceleration that is intended to sense occur as a result of the switching over. The method and device determine a change in torque as a function of the vehicle mass and the determined setpoint change in acceleration. The method and device determine a difference output from the change in torque, by which difference output a setpoint drive output is changed from a first drive output to a second drive output when switching over.

14 Claims, 5 Drawing Sheets

(51) Int. Cl.
*F02D 41/24* (2006.01)
*F02D 11/10* (2006.01)
*F02D 41/04* (2006.01)
*F02D 41/10* (2006.01)

(52) U.S. Cl.
CPC ............ *F02D 41/045* (2013.01); *F02D 41/10* (2013.01); *F02D 2200/1002* (2013.01); *F02D 2200/602* (2013.01); *F02D 2200/606* (2013.01)

(56) References Cited

U.S. PATENT DOCUMENTS

| | | | |
|---|---|---|---|
| 9,102,322 B2* | 8/2015 | Il | B60K 6/442 |
| 2005/0251319 A1* | 11/2005 | Feder | F02D 11/105 |
| | | | 701/110 |
| 2008/0015768 A1* | 1/2008 | Masuda | B60W 30/182 |
| | | | 701/99 |
| 2008/0162012 A1 | 7/2008 | Masuda et al. | |
| 2014/0207334 A1* | 7/2014 | Noumura | F16H 61/10 |
| | | | 701/37 |

FOREIGN PATENT DOCUMENTS

| | | |
|---|---|---|
| DE | 102 10 795 A1 | 10/2003 |
| DE | 10 2004 022 554 B3 | 11/2005 |
| DE | 10 2007 016 621 A1 | 10/2007 |
| EP | 1 593 826 A2 | 11/2005 |
| GB | 2498729 A | 7/2013 |
| WO | WO 2012/035401 A1 | 3/2012 |
| WO | WO 2013/110758 A1 | 8/2013 |

OTHER PUBLICATIONS

German Search Report dated Jul. 19, 2013, with Statement of Relevancy (Six (6) pages).
Chinese Office Action issued in Chinese counterpart application No. 201380063338.5 dated Oct. 25, 2016, with English translation (Twelve (12) pages).

* cited by examiner

METHOD AND DEVICE FOR IMPROVED SWITCHING OVER BETWEEN ACCELERATOR PEDAL CHARACTERISTIC CURVES

CROSS REFERENCE TO RELATED APPLICATIONS

This application is a continuation of PCT International Application No. PCT/EP2013/075044, filed Nov. 29, 2013, which claims priority under 35 U.S.C. §119 from German Patent Application No. 10 2012 222 482.3, filed Dec. 6, 2012, the entire disclosures of which are herein expressly incorporated by reference.

BACKGROUND AND SUMMARY OF THE INVENTION

The present invention relates to an improved method and an improved device for switching over between accelerator pedal characteristic curves in a motor vehicle. The method according to the invention and the device according to the invention ensure that the acceleration behavior and/or the deceleration behavior during the switching over between accelerator pedal characteristic curves can be reproduced and moves within controllable limits.

In motor vehicles according to the prior art, a plurality of accelerator pedal characteristic curves are present which define the dependence between the accelerator pedal angle with respect to an engine torque and/or drive torque. As a result it is possible to impress a different driving behavior, for example economical or sporty, on the motor vehicle. The switching over between the accelerator pedal characteristic curves is usually carried out by means of a switch which can be activated by the driver.

As soon as a new accelerator pedal characteristic curve is selected, a different drive torque is assigned to the current accelerator pedal angle even though the accelerator pedal angle has not changed. This can lead to a situation in which the motor vehicle accelerates strongly even though the driver has not changed the accelerator pedal position.

In order to avoid abrupt acceleration and/or deceleration, in the prior art a constant time period is provided within which the drive torque is changed from the value which was assigned to the original accelerator pedal characteristic curve to the drive torque which is assigned to the newly selected accelerator pedal characteristic curve. This can lead to a situation in which the vehicle unexpectedly accelerates strongly if a large change in drive torque occurs a switchover from a first accelerator pedal characteristic curve to a second accelerator pedal characteristic curve. On the other hand, the difference between two accelerator pedal characteristic curves may no longer be detectable by the driver if only a small change in drive torque occurs during the switching over between two accelerator pedal characteristic curves when there is a constant position of the accelerator pedal.

The invention has the object of providing an improved method and an improved device for switching over between accelerator pedal characteristic curves.

The object of the invention is achieved by a method for predefining a torque output of a motor vehicle drive engine which detects an accelerator pedal position and outputs a first drive output as a setpoint drive output to the motor vehicle drive engine as a function of the accelerator pedal position and a selected first pedal characteristic curve. The switching over from a first accelerator pedal characteristic curve to a second accelerator pedal characteristic curve is detected, for example when the accelerator pedal characteristic curve switch is pressed by the driver. A second drive output is determined as a function of the accelerator pedal position and the second accelerator pedal characteristic curve. If, for example, switching over occurs from an accelerator pedal characteristic curve for an economical driving mode to an accelerator pedal characteristic curve with a sporty driving mode, the second drive output may be higher than the first drive output, and the motor vehicle drive engine must make available a higher torque. The setpoint drive output is changed by a differential output per predetermined time interval from the first drive output to the second drive output. The setpoint drive output is changed from the first drive output to the second drive output in at least one step.

The predetermined time interval may be the time period between two computing steps of an accelerator pedal characteristic curve-switchover device and/or the chronological quantization interval of the accelerator pedal characteristic curve-switchover device for outputting the setpoint drive output.

The motor vehicle drive engine can be an internal combustion engine or an electric motor. It is also possible for the motor vehicle drive engine to be a combination of an internal combustion engine and an electric motor, for example a hybrid drive.

The setpoint drive output is changed in at least one stage, for example by means of a ramp with stages.

According to the invention, a change in the setpoint acceleration is determined, which is to occur as a result of the switching over from a first accelerator pedal characteristic curve to a second accelerator pedal characteristic curve. The change in the setpoint acceleration can be selected such that the driver of the motor vehicle senses, on the one hand, a change in acceleration but, on the other hand, the change in acceleration is not so strong that an undesirably strong acceleration occurs. The change in the setpoint acceleration can be stored, for example, in a database. The setpoint acceleration device can depend on a plurality of parameters.

A change in torque is determined as a function of the motor vehicle mass and the change in the setpoint acceleration. The setpoint drive output is determined from the change in torque.

The setpoint drive output can be a torque value, a fuel/air mixture, the proportion of fuel in a fuel/air mixture, the current for an electric motor and the like. The setpoint drive output can be transferred to an engine controller which determines the optimum fuel/air mixture and the optimum quantity of fuel in the fuel/air mixture so that the motor vehicle drive engine generates the desired torque.

In the prior art, the time in which the setpoint drive output changes during the switching over between two accelerator pedal characteristic curves is constant. This can lead to a situation in which the change in the setpoint acceleration can be too high or too low. According to the invention, the change in the setpoint acceleration is predefined and the time period over which the change in the setpoint acceleration is applied is kept variable. The driver therefore senses a reproducible change in the acceleration, which is applied for different lengths of time depending on the difference between the first drive output on the basis of the first accelerator pedal characteristic curve and the second drive output on the basis of the second accelerator pedal characteristic curve. Consequently, the switching over between the accelerator pedal characteristic curves is kept reproducible for the driver and does not lead to undesirably lower or undesirably high accelerations.

The method can also determine a setpoint acceleration which is to occur as a result of the switching over from a first accelerator pedal characteristic curve to a second accelerator pedal characteristic curve. Of course, the setpoint acceleration is the integral of the change in the setpoint acceleration, and the expression change in the setpoint acceleration also comprises the setpoint acceleration. The change in torque can be determined as a function of the vehicle mass and the setpoint acceleration. The setpoint drive output can be determined from the change in torque. The determination of the change in the setpoint acceleration and/or the setpoint acceleration can take into account a multiplicity of parameters which comprise, for example, the rotational speed of the motor vehicle drive engine, the currently engaged gearspeed, the first accelerator pedal characteristic curve, the current speed, the second accelerator pedal characteristic curve, the current accelerator pedal angle and/or the maximum torque of the motor vehicle drive engine. The change in the setpoint acceleration and/or the setpoint acceleration can vary depending on the first and/or second accelerator pedal characteristic curve. The change in the setpoint acceleration and/or the setpoint acceleration during the switching over between two accelerator pedal characteristic curves can also vary on the basis of the current accelerator pedal angle, the currently engaged gearspeed, the current speed, the rotational speed of the motor vehicle drive engine and/or on the basis of the maximum torque of the motor vehicle drive engine.

The object of the invention is also achieved by an accelerator pedal characteristic curve-switchover device. The accelerator pedal characteristic curve-switchover device can be embodied and developed in the way as previously described with respect to the method. In addition, the method previously described can be embodied in the way which is described below with respect to the accelerator pedal characteristic curve-switchover device.

The accelerator pedal characteristic curve-switchover device comprises an accelerator pedal position-detecting device which is designed to receive a signal relating to the position of an accelerator pedal, and have a setpoint drive output-outputting device which is designed to output a setpoint drive output to a motor vehicle drive engine. In addition, the accelerator pedal characteristic curve-switchover device comprises a control device which is designed to output a first drive output as a setpoint drive output to the setpoint drive output-outputting device as a function of the accelerator pedal position and a selected first pedal characteristic curve. The control device detects the switching over from a first accelerator pedal characteristic curve to a second accelerator pedal characteristic curve. The control device determines a second drive output as a function of the accelerator pedal position and the second accelerator pedal characteristic curve. The control device changes the setpoint drive output by a differential output per predetermined time interval from the first drive output to the second drive output. According to the invention, the control device determines a change in the setpoint acceleration which is to occur as a result of the switching over from a first accelerator pedal characteristic curve to a second accelerator pedal characteristic curve. In addition, the control device determines a change in torque as a function of the vehicle mass and the change in the setpoint acceleration. The control device determines the setpoint drive output from the change in torque.

The control device can be constructed from a discrete assembly or a discrete component or can extend over a plurality of assemblies or components. The accelerator pedal-detecting device can be an electrical interface or a network interface. The setpoint drive output-outputting device can in any case be an especially configured electrical interface or a general network interface.

The control device can also be designed to determine a setpoint acceleration which is to occur as a result of the switching over from a first accelerator pedal characteristic curve to a second accelerator pedal characteristic curve. The control device can determine the change in torque as a function of the vehicle mass and the setpoint acceleration. The setpoint drive output can be determined from the change in torque. During the determination of the change in the setpoint acceleration and/or the setpoint acceleration the control device can take into account the rotational speed of the motor vehicle drive engine, the currently engaged gearspeed, the current speed, the first accelerator pedal characteristic curve, the second accelerator pedal characteristic curve, the current accelerator pedal angle and/or the maximum torque of the motor vehicle drive engine.

The time interval can be the time period between two computing steps of the accelerator pedal characteristic curve-switchover device and/or the chronological quantization interval of the accelerator pedal characteristic curve-switchover device for outputting the setpoint drive output.

The invention will be explained in detail below with reference to the figures which show illustrations of non-restrictive embodiments of the invention and which serve for better comprehension thereof. In the drawings: Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
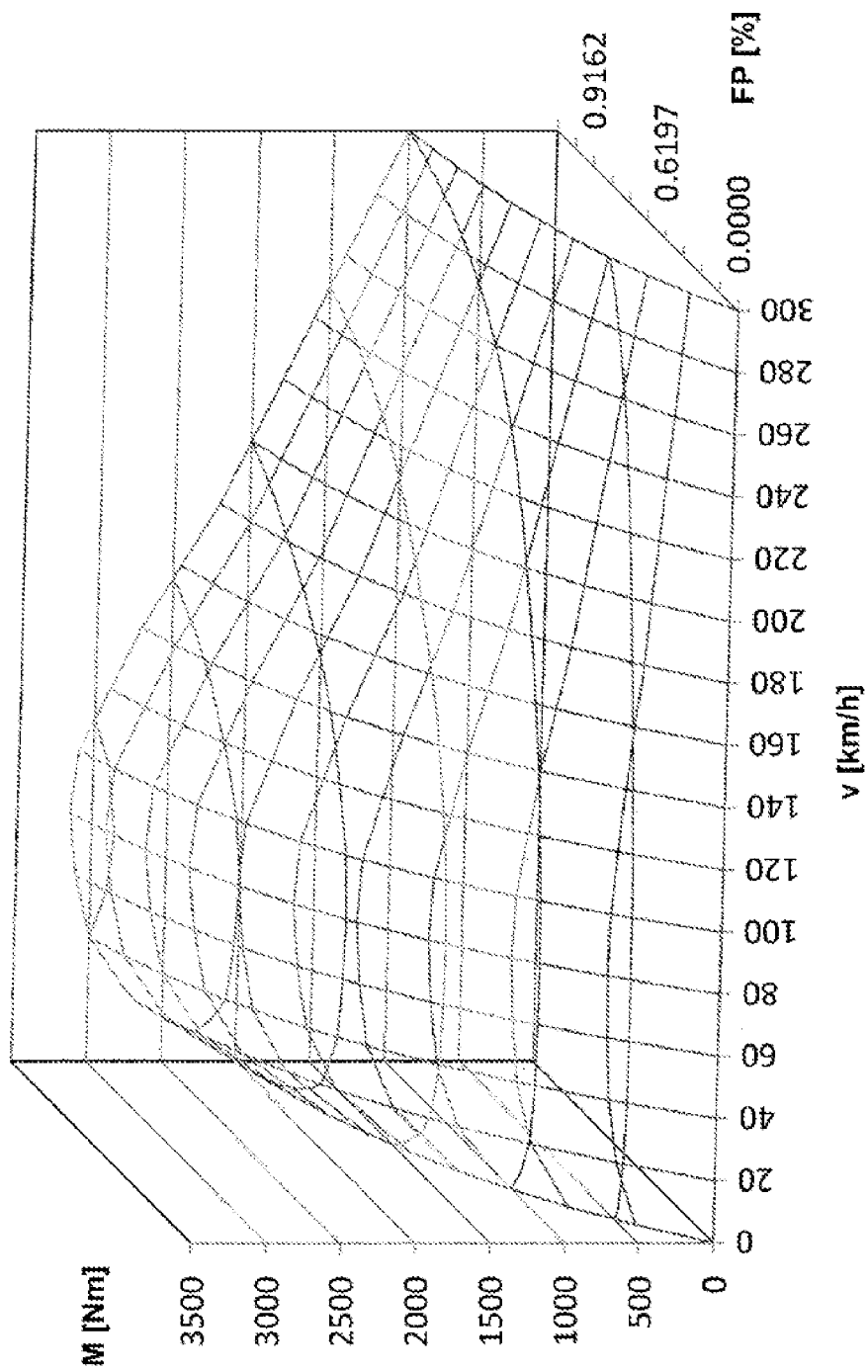
FIG. 1 shows an accelerator pedal characteristic curve diagram for a sporty driving mode.
Figure 2:
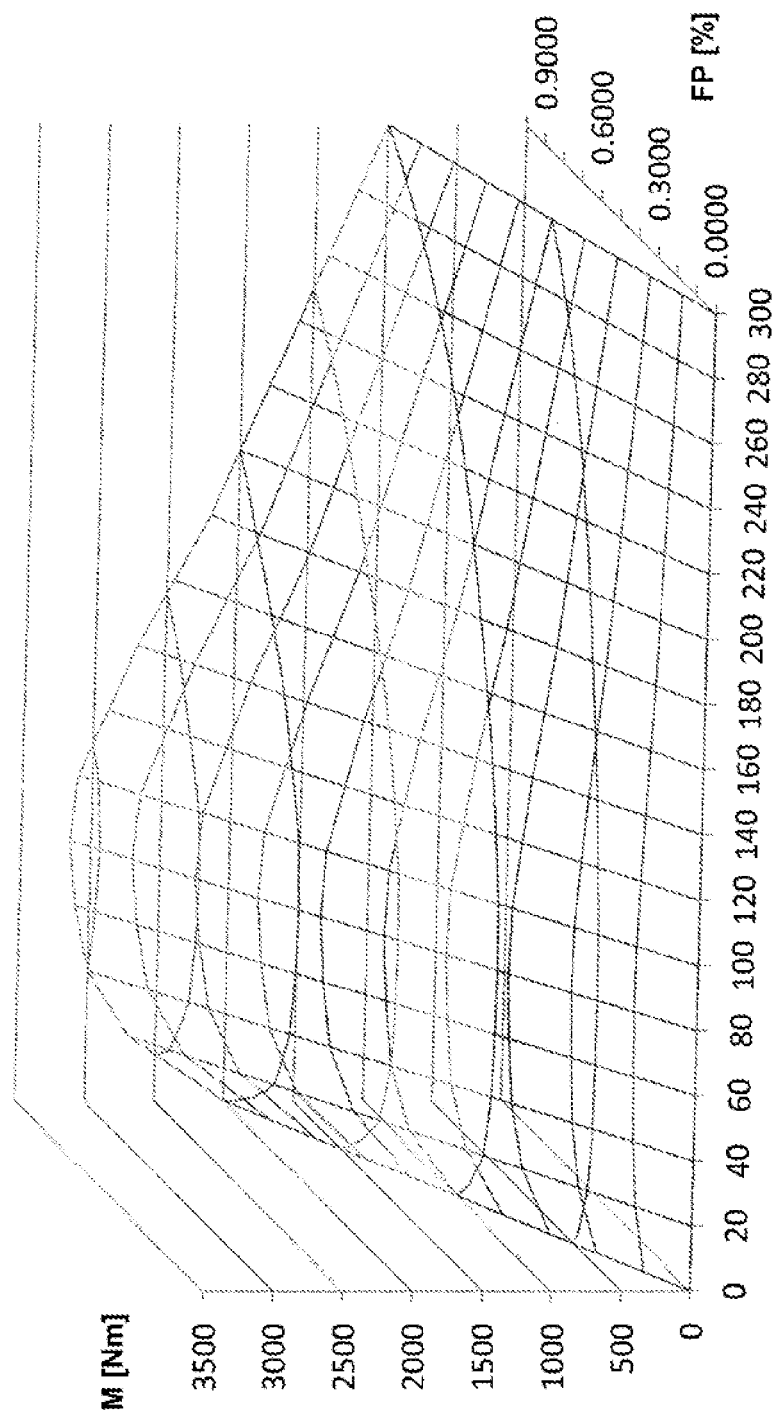
FIG. 2 shows an accelerator pedal characteristic curve diagram for a normal driving mode.
Figure 3:
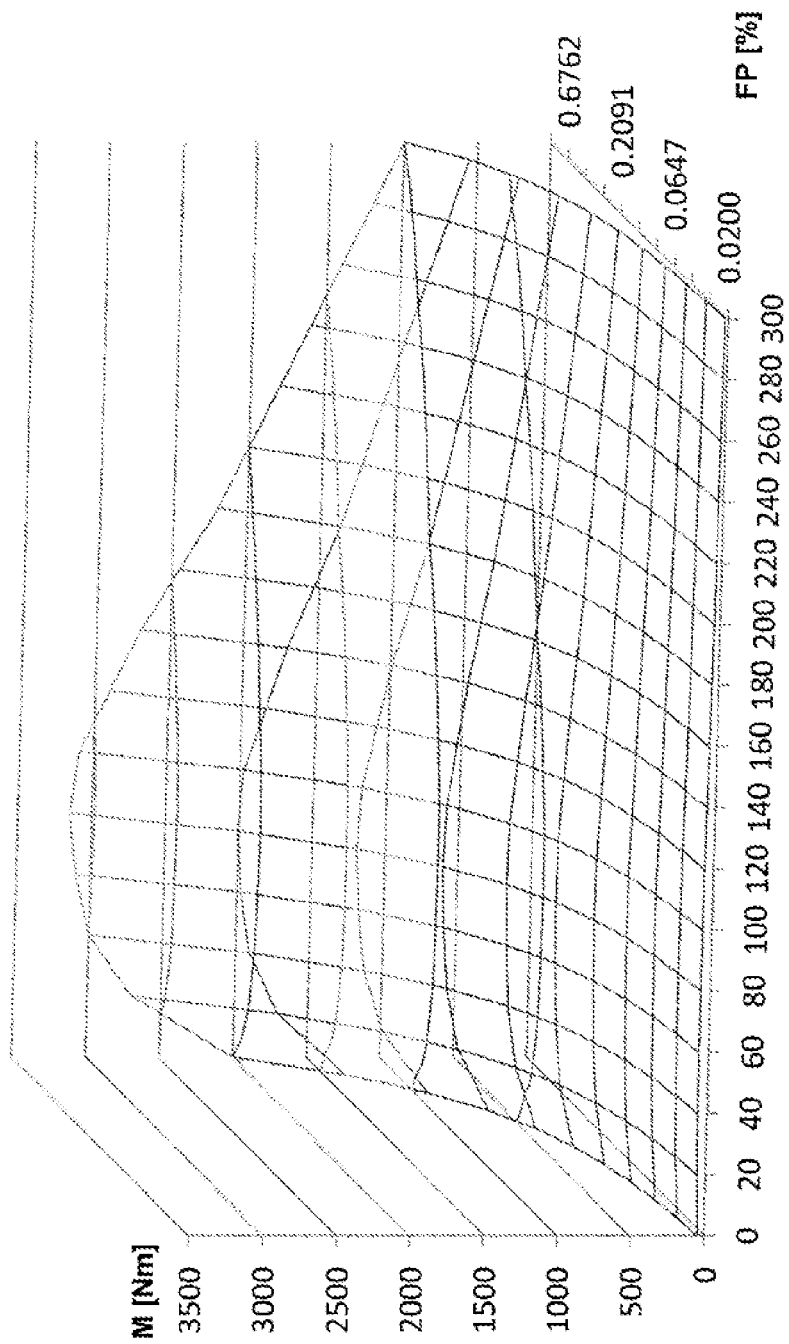
FIG. 3 shows an accelerator pedal characteristic curve diagram for an economical driving mode.

FIGS. 1 to 3 show exemplary accelerator pedal characteristic curve diagrams, wherein FIG. 1 corresponds to an accelerator pedal characteristic curve diagram for a sporty mode, FIG. 2 to a characteristic curve diagram for a normal driving mode and FIG. 3 to a characteristic curve diagram for an economical driving mode. The X axis shows the speed in km/h. The Y axis shows the relative accelerator pedal position. The Z axis shows the torque which is to be output by the engine.

It is apparent that in FIG. 1 the engine already outputs a comparatively high torque in the case of a comparatively low activation of the accelerator pedal. As a result, a sporty driving mode can be implemented, since a high torque is already made available in response to a slight activation of the accelerator pedal.

In contrast to this, it is apparent in FIG. 3 that a relatively low torque is output by the engine even in the case of a comparatively strong activation of the accelerator pedal. As a result, an economical driving mode can be implemented which is optimized to a low fuel consumption. FIG. 2 shows an accelerator pedal characteristic diagram for a normal driving mode in which the response of the engine is between the characteristic curve diagrams shown in FIGS. 1 and 3.

Figure 4:
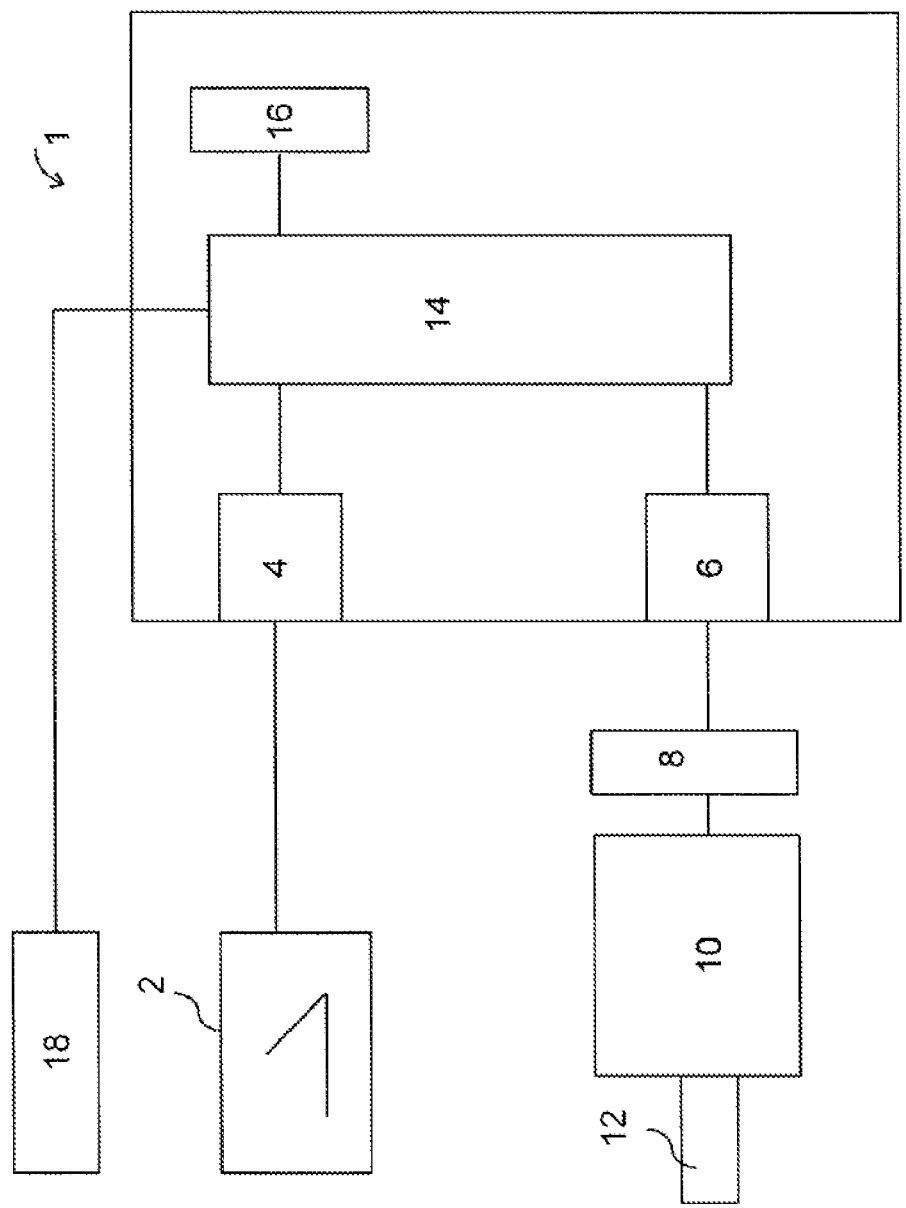
FIG. 4 shows a block diagram of the present invention.

FIG. 4 shows an inventive accelerator pedal characteristic curve-switchover device 1 which comprises an accelerator pedal position-detecting device 4, a setpoint drive output-outputting device 6, a control device 14 and a memory 16. An accelerator pedal 2 is connected to the accelerator pedal position-detecting device 4. An engine controller 8, which is connected to an engine 10, is connected to the setpoint drive output-outputting device 6. The engine 10 outputs a torque via a shaft 12. The accelerator pedal position-detecting device 2 receives the position of the accelerator pedal 2 and transfers the current position of the accelerator pedal 2 to the control device 14. The control device 14 outputs a setpoint drive output to the setpoint drive output-outputting device 6. The setpoint drive output is transferred to the engine controller 8 which determines a fuel/air mixture and, in particular, the quantity of fuel fed to the engine 10. The fuel is burnt in the engine 10 in order to generate a drive torque at the shaft 12. The accelerator pedal characteristic curve is selected with the accelerator pedal switch 18. The engine 10 can be an internal combustion engine or an electric motor. It is also possible for the engine 10 to be a combination of internal combustion engine and electric motor, for example a hybrid motor.

Changes in the setpoint acceleration are stored in the memory 16. The changes in the setpoint acceleration can depend on a plurality of parameters, for example on the rotational speed of the engine, the currently engaged gear-speed, the current speed, the current accelerator pedal characteristic curve, the previously used accelerator pedal characteristic curve, the current accelerator pedal angle and/or the maximum torque of the motor vehicle drive engine.

Figure 5:
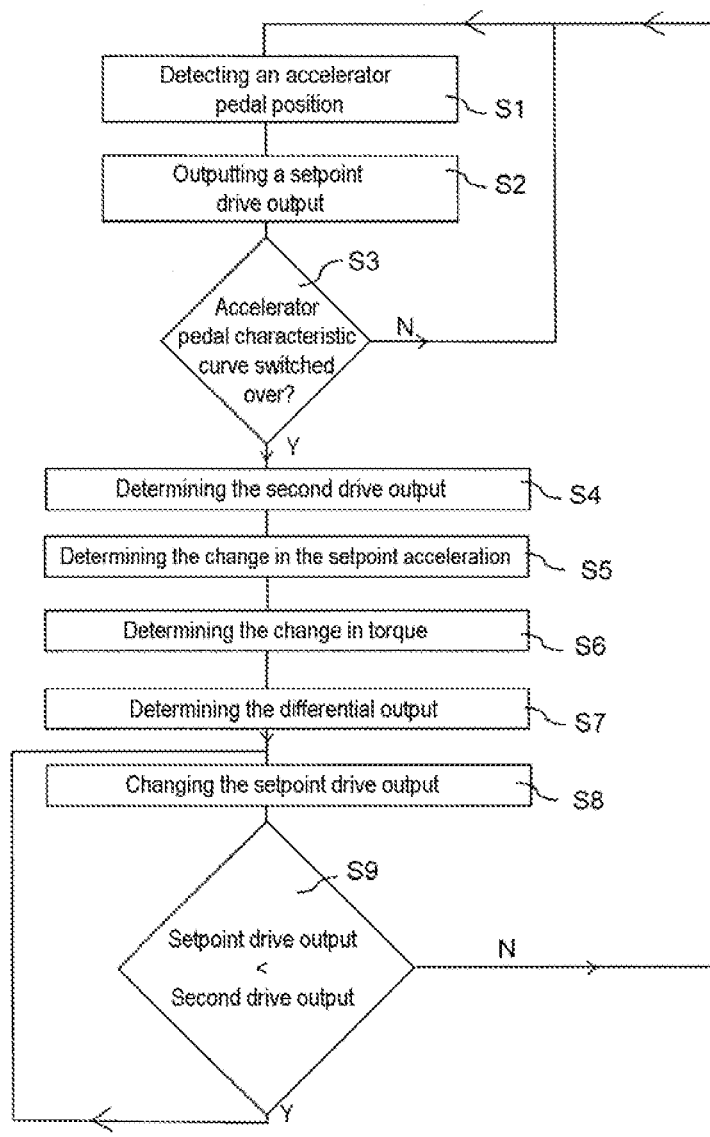
FIG. 5 shows a flowchart of the present invention.

The method according to the invention and the method of functioning of the accelerator pedal characteristic curve-switchover device 1 will be explained with reference to FIG. 5. In step S1, the position of the accelerator pedal, which the driver can change by activating the accelerator pedal, is checked by means of the accelerator pedal position-detecting device 4. In step S2, a first drive output is output as a setpoint drive output to the engine 10 as a function of the accelerator pedal position and a selected first pedal characteristic curve by means of the setpoint drive output-outputting device 6.

In step S3 it is checked whether the driver has changed the accelerator pedal characteristic curve by activating an accelerator pedal characteristic curve switch 18. If the accelerator pedal characteristic curve has not been switched over, the system returns to step S1. If the accelerator pedal characteristic curve-switchover device 1 detects that the accelerator pedal characteristic curve has been changed by pressing the accelerator pedal characteristic curve switch 18, the method and the accelerator pedal characteristic curve-switchover device 1 proceed with the step S4. In step S4, a second drive output is determined as a function of the accelerator pedal position and the second accelerator pedal characteristic curve.

In step S5, a change in the setpoint acceleration which is to occur as a result of the switching over from a first accelerator pedal characteristic curve to a second accelerator pedal characteristic curve is determined, for example by calling a value from the memory 16. In step S6, a change in torque is determined as a function of the estimated vehicle mass and the change in the setpoint acceleration. In step S7, a differential output is then determined from the change in torque. The differential output indicates the amount by which the setpoint drive output is to change per unit of time. The differential output can have the unit $sec^{-3}$ in one embodiment.

The estimation of the mass of the vehicle can also comprise the determination of the mass with sufficient accuracy. The step S6 for determining the change in torque can also take into account driving resistances, wind conditions, a gradient and the like.

The setpoint drive output can be increased in step S8 by the differential output per predetermined time interval from the first drive output, which is assigned to the first accelerator pedal characteristic curve, to the second drive output, which is assigned to the second accelerator pedal characteristic curve. The time interval can be the time period between two computing steps of the accelerator pedal characteristic curve-switchover device. The time period can also be the chronological quantization interval of the accelerator pedal characteristic curve-switchover device 1 for outputting the setpoint drive output via the setpoint drive output-outputting device 6.

In step S9 it is checked whether the setpoint drive output is lower than the second drive output. If the setpoint drive output is lower than the second drive output, the torque which is to be output on the basis of the current accelerator pedal position and the second accelerator pedal characteristic curve is not yet made available by the engine. Therefore, the method returns to the step S8 and increases once more the setpoint drive output by the differential output.

Of course, during the execution of the steps S4 to S9 the accelerator pedal position is checked (cyclically). As soon as the accelerator pedal position has been changed, the second drive output, the change in the setpoint acceleration, the differential output and/or the setpoint drive output are calculated anew on the basis of the changed accelerator pedal position. As a result, a change in the accelerator pedal position which represents an acceleration or deceleration desired by the driver can also be taken into account during the switching over of the accelerator pedal characteristic curve.

If the setpoint drive output is not lower than the drive output, the method returns to step S1. The switching over from the first accelerator pedal characteristic curve to the second accelerator pedal characteristic curve is therefore ended.

The present invention provides the advantage that the switching over from one accelerator pedal characteristic curve to another accelerator pedal characteristic curve leads to a reproducible change in torque. As a result, the driving comfort and the safety can be increased, since no unexpected accelerations and decelerations can occur.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for predefining a torque output of a motor vehicle drive engine, comprising the acts of:
   detecting an accelerator pedal position;
   outputting a first drive output as a setpoint drive output to the motor vehicle drive engine as a function of the accelerator pedal position and a selected first pedal characteristic curve;
   detecting a switching over from the first accelerator pedal characteristic curve to a second accelerator pedal characteristic curve;
   determining a second drive output as a function of the accelerator pedal position and the second accelerator pedal characteristic curve; and changing the setpoint drive output by a differential output from the first drive output to the second drive output over a time interval, wherein changing the setpoint drive output includes:
  selecting a predetermined change in a setpoint acceleration that is to occur over the time interval as a result of the switching over from the first accelerator pedal characteristic curve to the second accelerator pedal characteristic curve;
  determining the time interval based on a difference between the first and second drive outputs,
  determining a change in torque as a function of an estimated vehicle mass and the change in the setpoint acceleration; and
  determining the differential output from the change in torque.

2. The method as claimed in claim 1, further comprising the acts of:
  determining the setpoint acceleration that is to occur as a result of the switching over from a first accelerator pedal characteristic curve to a second accelerator pedal characteristic curve.

3. The method as claimed in claim 1, wherein said determining the change in the setpoint acceleration comprises determining the change in the setpoint acceleration as a function of at least one of the following:
  a rotational speed of the motor vehicle drive engine,
  a currently engaged gearspeed,
  a current speed,
  first accelerator pedal characteristic curve,
  the second accelerator pedal characteristic curve,
  a current accelerator pedal angle, and
  a maximum torque of the motor vehicle drive engine.

4. The method as claimed in claim 2, wherein said determining the change in the setpoint acceleration comprises determining the change in the setpoint acceleration as a function of at least one of the following:
  a rotational speed of the motor vehicle drive engine,
  a currently engaged gearspeed,
  a current speed,
  the first accelerator pedal characteristic curve,
  the second accelerator pedal characteristic curve,
  a current accelerator pedal angle, and
  a maximum torque of the motor vehicle drive engine.

5. The method as claimed in claim 2, wherein said determining the setpoint acceleration comprises determining the setpoint acceleration as a function of at least one of the following:
  a rotational speed of the motor vehicle drive engine,
  a currently engaged gearspeed,
  a current speed,
  the first accelerator pedal characteristic curve,
  the second accelerator pedal characteristic curve,
  a current accelerator pedal angle, and
  a maximum torque of the motor vehicle drive engine.

6. The method as claimed in claim 1, wherein said time interval is at least one of the following:
  a time period between two computing steps of an accelerator pedal characteristic curve switchover device; and
  a chronological quantization interval of an accelerator pedal characteristic curve switchover device for outputting the setpoint drive output.

7. The method as claimed in claim 5, wherein said time interval is at least one of the following:
  a time period between two computing steps of an accelerator pedal characteristic curve switchover device; and
  a chronological quantization interval of an accelerator pedal characteristic curve switchover device for outputting the setpoint drive output.

8. An accelerator pedal characteristic curve-switchover device, comprising:
  an accelerator pedal position-detecting device configured to receive a signal relating to the position of an accelerator pedal;
  a setpoint drive output-outputting device configured to output a setpoint drive output to a motor vehicle drive engine; and
  a control device configured to:
    output a first drive output as a setpoint drive output to the setpoint drive output-outputting device as a function of the accelerator pedal position and a selected first pedal characteristic curve,
    detect a switching over from the first accelerator pedal characteristic curve to a second accelerator pedal characteristic curve,
    determine a second drive output as a function of the accelerator pedal position and the second accelerator pedal characteristic curve,
    change the setpoint drive output by a differential output from the first drive output to the second drive output over a time interval, wherein changing the setpoint drive output includes:
      selecting a predetermined change in a setpoint acceleration that is to occur over the time interval as a result of the switching over from the first accelerator pedal characteristic curve to a second accelerator pedal characteristic curve,
      determining the time interval based on a difference between the first and second drive outputs,
      determining a change in torque as a function of an estimated vehicle mass and the change in the setpoint acceleration, and
      determining the differential output from the change in torque.

9. The accelerator pedal characteristic curve-switchover device as claimed in claim 8, wherein the control device is further configured to:
  determine the setpoint acceleration that is to occur as a result of the switching over from a first accelerator pedal characteristic curve to a second accelerator pedal characteristic curve.

10. The accelerator pedal characteristic curve-switchover device as claimed in claim 8, wherein the control device is configured to take into account at least one of the following variables during said determination of the change in the setpoint acceleration:
  a rotational speed of the motor vehicle drive engine,
  a currently engaged gearspeed,
  a current speed,
  the first accelerator pedal characteristic curve,
  the second accelerator pedal characteristic curve,
  a current accelerator pedal angle, and
  a maximum torque of the motor vehicle drive engine.

11. The accelerator pedal characteristic curve-switchover device as claimed in claim 9, wherein the control device is configured to take into account at least one of the following variables during said determination of the change in the setpoint acceleration:
  a rotational speed of the motor vehicle drive engine,
  a currently engaged gearspeed,
  a current speed,
  the first accelerator pedal characteristic curve,
  the second accelerator pedal characteristic curve, a current accelerator pedal angle, and a maximum torque of the motor vehicle drive engine.

12. The accelerator pedal characteristic curve-switchover device as claimed in claim 9, wherein the control device is configured to take into account at least one of the following variables during said determination of the setpoint acceleration:

a rotational speed of the motor vehicle drive engine, a currently engaged gearspeed, a current speed, the first accelerator pedal characteristic curve, the second accelerator pedal characteristic curve, a current accelerator pedal angle, and a maximum torque of the motor vehicle drive engine.

13. The accelerator pedal characteristic curve-switchover device as claimed in claim 9, wherein the time interval is at least one of the following:

a time period between two computing steps of the accelerator pedal characteristic curve-switchover device; and a chronological quantization interval of an accelerator pedal characteristic curve-switchover device for outputting the setpoint drive output.

14. The accelerator pedal characteristic curve-switchover device as claimed in claim 12, wherein the time interval is at least one of the following:

a time period between two computing steps of the accelerator pedal characteristic curve-switchover device; and a chronological quantization interval of an accelerator pedal characteristic curve-switchover device for outputting the setpoint drive output.

\* \* \* \* \*